United States Patent
Miyake et al.

(10) Patent No.: US 11,808,611 B2
(45) Date of Patent: Nov. 7, 2023

(54) SCALE

(71) Applicant: MITUTOYO CORPORATION, Kanagawa (JP)

(72) Inventors: Kosaku Miyake, Kanagawa (JP); Toshihiko Aoki, Kanagawa (JP)

(73) Assignees: MITUTOYO CORPORATION, Kanagawa (JP); MITUTOYO CORPORATION, Kanagawa (JP)

( * ) Notice: Subject to any disclaimer, the term of this patent is extended or adjusted under 35 U.S.C. 154(b) by 518 days.

(21) Appl. No.: 17/174,763

(22) Filed: Feb. 12, 2021

(65) Prior Publication Data
US 2021/0262833 A1 Aug. 26, 2021

(30) Foreign Application Priority Data
Feb. 20, 2020 (JP) .................... 2020-026899

(51) Int. Cl.
*G01D 5/347* (2006.01)

(52) U.S. Cl.
CPC ................ *G01D 5/34707* (2013.01)

(58) Field of Classification Search
CPC ............................... G01D 5/34707
USPC ........................ 33/706, 707, 708
See application file for complete search history.

(56) References Cited

U.S. PATENT DOCUMENTS

| | | | | |
|---|---|---|---|---|
| 6,115,153 A * | 9/2000 | Tomita | ............ | G01D 5/38 250/237 G |
| 6,671,092 B2 * | 12/2003 | Flatscher | ............ | G02B 5/08 250/237 G |
| 6,794,638 B2 * | 9/2004 | Aoki | ............ | G01D 5/3473 250/237 G |
| 7,289,229 B2 * | 10/2007 | Otsuka | ............ | G01D 5/34715 250/237 G |
| 7,491,286 B2 * | 2/2009 | Kagan | ............ | G03F 7/0002 427/261 |
| 9,677,874 B2 * | 6/2017 | Speckbacher | ............ | G01D 5/34 |
| 9,958,263 B2 | 5/2018 | Imaizumi et al. | | |
| 11,054,286 B2 * | 7/2021 | Aoki | ............ | G01D 5/34707 |
| 2006/0140538 A1 | 6/2006 | Isano et al. | | |
| 2019/0204119 A1 * | 7/2019 | Aoki | ............ | G01D 5/38 |
| 2020/0319001 A1 | 10/2020 | Kato | | |
| 2020/0408968 A1 | 12/2020 | Aoki et al. | | |

FOREIGN PATENT DOCUMENTS

| | | |
|---|---|---|
| JP | H05-332792 A | 12/1993 |
| JP | 2005-308718 A | 11/2005 |
| JP | 2006-178312 A | 7/2006 |
| JP | 2009-281990 A | 12/2009 |

* cited by examiner

*Primary Examiner* — George B Bennett
(74) *Attorney, Agent, or Firm* — Greenblum & Bernstein, P.L.C.

(57) ABSTRACT

A scale includes a base material, scale patterns arranged at a predetermined periodicity on a main surface of the base material, and a fluorine film that covers the scale patterns and is at least partly a monomolecular fluorine compound.

13 Claims, 5 Drawing Sheets

SCALE

CROSS-REFERENCE TO RELATED APPLICATIONS

The present application claims priority under 35 U.S.C. § 119 of Japanese Application No. 2020-026899, filed on Feb. 20, 2020, the disclosure of which is expressly incorporated by reference herein in its entirety.

BACKGROUND OF THE INVENTION

1. Field of the Invention

The present invention relates to a scale.

2. Description of Related Art

Scales used for an encoder or the like are disclosed. These scales are formed with scale patterns such as a scale grating (see, for example, Japanese Patent Laid-open Publication No. 2005-308718). From a viewpoint of inhibiting corrosion of the scale patterns, a technique that covers the scale patterns with an inorganic material is disclosed (see, for example, Japanese Patent Laid-open Publication Nos. 2009-281990 and 2006-178312). Also, a technique that covers the scale patterns with a fluorine resin is disclosed (see, for example, Japanese Patent Laid-open Publication No. H05-332792).

However, corrosion may not be prevented even when the scale patterns are covered by the inorganic material. Even when the scale patterns are covered by the fluorine resin, when the fluorine resin that has formed a thick film suffers a scratch or the like that causes diffused reflection, measurement accuracy may drop.

SUMMARY OF THE INVENTION

On one side, the present invention provides a scale that can maintain a high degree of measurement accuracy while inhibiting corrosion.

In one aspect, the scale according to the present invention includes a base material, scale patterns arranged at a predetermined periodicity on a principal surface of the base material, and a fluorine film that covers the scale patterns and is at least partly a monomolecular fluorine compound.

In the scale noted above, a maximum thickness from a surface of each scale pattern to a surface of the fluorine film may be 5 nm or greater and 30 nm or less.

The scale noted above may be provided with a transparent dielectric film that covers each scale pattern between the scale patterns and the fluorine film.

In the scale noted above, a total thickness of the fluorine film and the dielectric film may be 5 nm or greater and 30 nm or less.

In the scale noted above, the dielectric film may be made of $SiO_2$.

In the scale noted above, the scale patterns may be made of metal.

In the scale noted above, the base material may be made of a transparent material, and the scale patterns may be made of a transparent material or a translucent material.

In the scale noted above, the base material may be made of a metallic tape.

The present invention can provide a scale that can maintain a high degree of measurement accuracy while inhibiting corrosion.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1A:
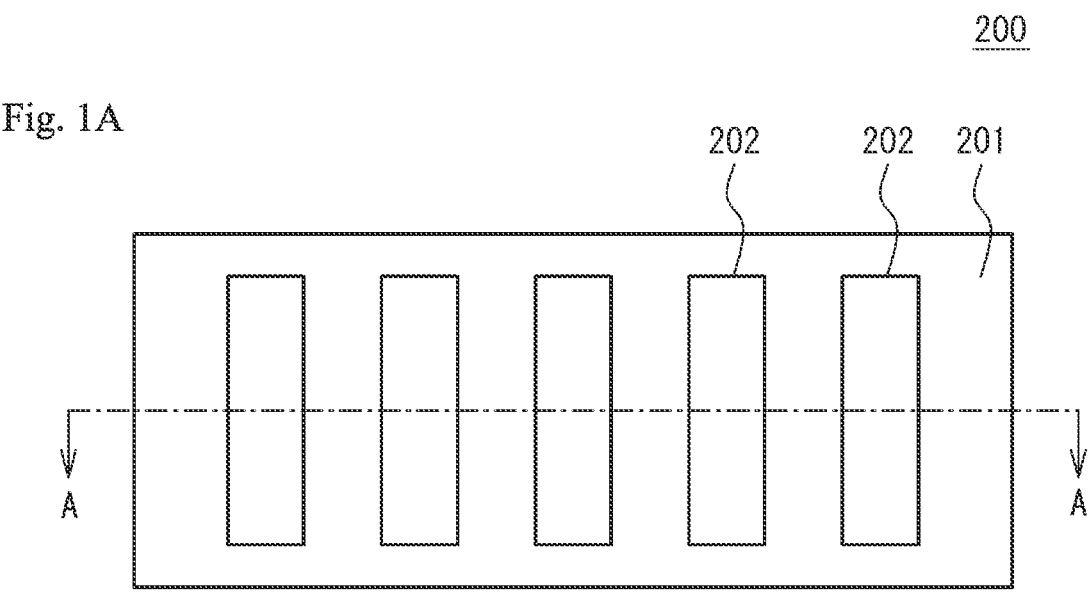
FIG. 1A is a plan view of a scale and FIG. 1B is a cross-sectional view along a line A-A of FIG. 1A.
Figure 1B:
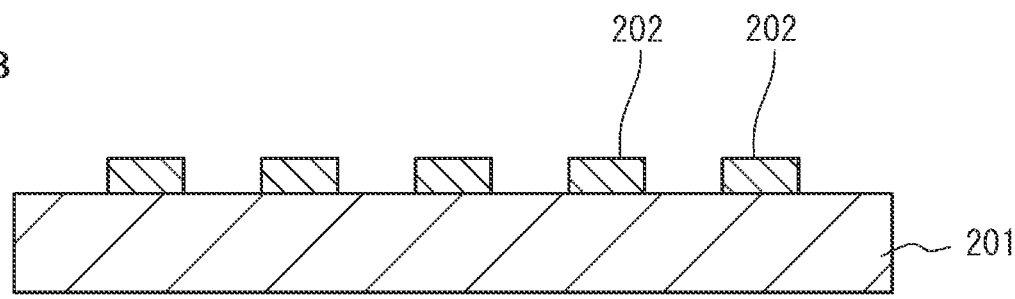

Before describing embodiments, a summary description of a scale is provided first. FIG. 1A is a plan view of a scale 200. FIG. 1B illustrates a cross-sectional view along a line A-A of FIG. 1A. As exemplified in FIGS. 1A and 1B, the scale 200 has a structure in which scale patterns 202 are arranged at a predetermined interval on a substrate 201. Each scale pattern 202 has a structure in which a plurality of gratings are arranged and configures a scale grating. For example, each grating of the scale patterns 202 has, on a first principal (or main) surface of the substrate 201, a length direction that lies in a direction orthogonal to an array direction of each grating.

When the scale 200 is a phase reflective-type scale, the scale patterns 202 is a high reflection film and uses metal as a material. In such a configuration, when the scale 200 is exposed to humidity, corrosive gas, or a chemically active liquid such as coolant, corrosion starts from a surface, a boundary surface between exposed laminated films, an interface between the film and the base material, and the like, and deformation and discoloration occur due to deterioration. In this case, a defect arises such that an encoder signal is not properly detected, and the scale is unable to withstand long-term use. Therefore, the scale should be used in an environment with no condensation, and away from high temperature and high humidity.

Given this, in order to inhibit corrosion of a structure with a scale surface made of a plurality of substances including metal, thickly covering the grating with a film made of a chemically stable transparent dielectric such as $SiO_2$ is considered. However, in a state where liquid stays on the surface for a long time due to condensation or a high temperature and high humidity environment, metal ions are eluted to produce inorganic salt, a circumstance arises in which a pattern such as water scale or fine particles such as ash fuse onto the surface, and optical properties of the surface may change over time and deteriorate.

In view of the above, coating the grating with a fluorine resin is considered. However, when an ordinary fluorine resin is used, the fluorine resin forms a thick film. In such a case, when the fluorine resin suffers a scratch causing diffused reflection, position information may not be read properly from the scale 200. Accordingly, there is a possibility that measurement accuracy may drop.

In view of this, the embodiments below describe a scale that can maintain a high degree of measurement accuracy while inhibiting corrosion.

First Embodiment

Figure 2:
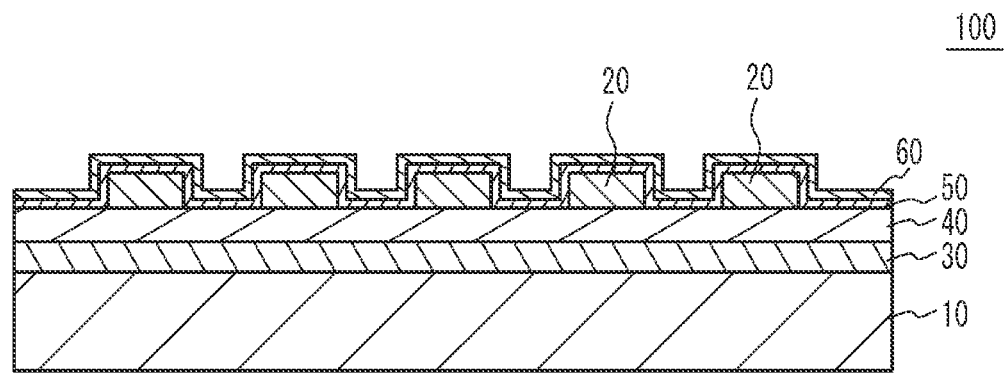
FIG. 2 is a cross-sectional view of the scale according to a first embodiment.

FIG. 2 is a cross-sectional view of a scale 100 according to a first embodiment. The scale 100 is a light reflective-type scale. As exemplified in FIG. 2, a multilayer reflection film is laminated on a first principal surface of a substrate 10. For example, a first reflection film 30 is laminated on the first principal surface of the substrate 10, and a second reflection film 40 is laminated on the first reflection film 30. A scale pattern 20, in which a plurality of gratings are arranged at a predetermined interval, is provided on the second reflection film 40. A protection film 50 is provided so as to cover an exposed portion of the second reflection film 40 and the scale pattern 20. Further, a fluorine film 60 is provided so as to cover the protection film 50.

Similar to the scale 200 in FIGS. 1A and 1B, the plurality of gratings are arranged at the predetermined interval on the first principal surface of the substrate 10. The scale pattern 20 configures a scale grating. In addition, with respect to in-plane directions of the substrate 10, each grating of the scale pattern 20 has a length direction that lies in a direction orthogonal to an array direction of each grating. The scale patterns 20 is made of a metal like copper, chrome, titanium, nickel, silicon, germanium, tin, and the like.

The substrate 10 is made of a material like silica glass, soda-lime glass, or epoxy glass. The first reflection film 30 is provided to increase adhesion between the substrate 10 and the second reflection film 40, and is a high reflection film made of a material like chrome, silicon, titanium, or oxides of the same. When forming the scale pattern 20 by an etching process, the second reflection film 40 is provided as an etch stop layer to keep the height of the machined surface uniform, and is a high reflection film made of a material like copper, silver, nickel, vanadium, iron, cobalt, titanium, or tin, or combinations thereof.

The protection film 50 is a film provided to protect the multilayer reflection film and the scale pattern 20. The protection film 50 is made of a chemically stable transparent dielectric. For example, the protection film 50 is made of a glass like glass silica. Alternatively, the protection film 50 is made of a metal oxide like aluminum oxide, zirconium oxide, and magnesium oxide. Alternatively, the protection film 50 is made of a nitride compound like silicon nitride and aluminum nitride. Alternatively, the protection film 50 is made of a material like diamond or silicon carbide. By providing the protection film 50, corrosive gas and chemical substances are inhibited from entering the multilayer reflection film and the scale pattern 20. In addition, scratches to the multilayer reflection film and the scale pattern 20 can be inhibited. The protection film 50 can be formed by, for example, applying and drying an isotropic sputter, a chemical vapor film, or a wet-type glass coating agent.

The fluorine film 60 covers at least a portion of the protection film 50 with a monomolecular fluorine compound. The fluorine film 60 may also entirely cover the protection film 50 with the monomolecular fluorine compound. The monomolecular fluorine compound can be formed after spray coating or dip coating by leaving behind a monomolecular layer when removed by drying and liquid cleaning. The monomolecular fluorine compound can be coated on, for example, using Fluorosurf, Optool, SF coating, CS1, or the like.

According to the first embodiment, the fluorine film 60 has a water-repellent property and can inhibit the accumulation of condensation and water drops. Accordingly, corrosion of the scale pattern 20 can be inhibited. For example, corrosion can be inhibited even in a high temperature and high humidity environment with a temperature of 120° C. and humidity of 100% for 24 hours. In particular, the fluorine film 60 covers an interface having poor adhesion between the dielectric and the metal (interface between the scale pattern 20 and the protection film 50), and can thereby effectively inhibit corrosion of the scale pattern 20. Further, even when dirt adheres to the fluorine film 60, the dirt can be easily wiped off. For example, a solvent such as alcohol or ketone can be used to wipe off the film. Furthermore, the monomolecular fluorine compound is used for the fluorine film 60, thereby allowing the fluorine film 60 to be a thin film. In this case, even when the fluorine film 60 suffers a scratch or the like, diffuse reflection is inhibited. In addition, friction against the surface of the scale 100 is reduced by the fluorine film 60, and therefore sliding performance of an encoder in which the scale 100 is installed becomes smooth and a scratch due to friction is inhibited from creating dust. Further, because of the reduced friction, strength against lateral force applied to the scale pattern 20 is improved. As a result, measurement accuracy of the scale 100 is improved. Based on the above, the present invention can maintain a high degree of accuracy while prohibiting corrosion.

In addition, when the encoder in which the scale 100 is installed is an encoder that reads a position utilizing light reflection, an adhered liquid film that is large in size compared to a spot diameter φ of light which is 0.5 mm to 2 mm, and that develops due to contamination from adhered moisture or oil, presents a challenge such that position information cannot be read over a wide range during use, but this challenge can be inhibited. In other words, because the liquid film that develops due to contamination splits into a size of about 0.1 mm on the surface of the fluorine film 60 during use, causing a portion of the grating surface to be exposed, the encoder can continue reading positions by adjusting the intensity of the laser light at any time.

Figure 3:
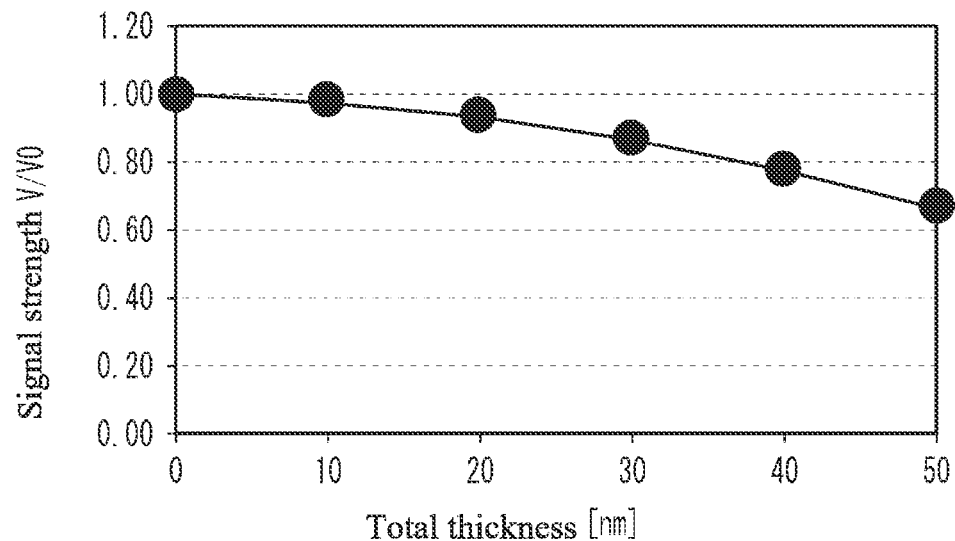
FIG. 3 illustrates a relationship between a signal strength and a total thickness of a protection film and a fluorine film.

The protection film 50 and the fluorine film 60 serve as chemically stable protection layers, and can inhibit an influence of material deterioration with respect to optical characteristics over a long period of time. When the total thickness of the protection film 50 and the fluorine film 60 is large, thickness varies and may influence the optical characteristics of the scale 100. Given this, it is preferable to provide an upper limit on the total thickness of the protection film 50 and the fluorine film 60. For example, as illustrated in the simulation results of FIG. 3, as the total thickness of the protection film 50 and the fluorine film 60 grows larger, the signal strength is reduced. The vertical axis in FIG. 3 shows a normalized value for when 1.00 is defined as the signal strength with neither the protection film 50 nor the fluorine film 60 provided. In order to ensure the signal strength is ≥0.80, the total thickness of the protection film 50 and the fluorine film 60 is preferably 30 nm or less. In this case, even with the protection film 50, it is possible to suppress a reduction in diffraction efficiency, which is an indicator of an encoder signal performance, to 3% or less than a design value, for example. Also, because the protection film 50 and the fluorine film 60 are very thin, the films can be applied even to a three-dimensional structure having a grating width and grating intervals of 100 nm or less. For example, each of the protection film 50 and the fluorine film 60 preferably has a thickness smaller than the height of the scale pattern 20. In addition, the total thickness of the protection film 50 and the fluorine film 60 is preferably smaller than the height of the scale pattern 20. On the other hand, when the total thickness of the protection film 50 and the fluorine film 60 is too small, the performance of the protection film 50 and the fluorine film 60 may not be fully obtained. Given this, it is preferable to provide a lower limit on the total thickness of the protection film 50 and the fluorine film 60. In the present embodiment, the total thickness of the protection film 50 and the fluorine film 60 is preferably 5 nm or greater.

Further, the protection film 50 can also be formed on the surfaces of the second reflection film 40 and the scale pattern 20 by oxidizing the protection film 50 so as to be homogeneous by performing a process such as a natural oxidation treatment, a heat treatment, or a plasma treatment, and then by applying a hydroxyl group with a plasma treatment.

In the present embodiment, the substrate 10 is an example of a base material.

Second Embodiment

Figure 4:
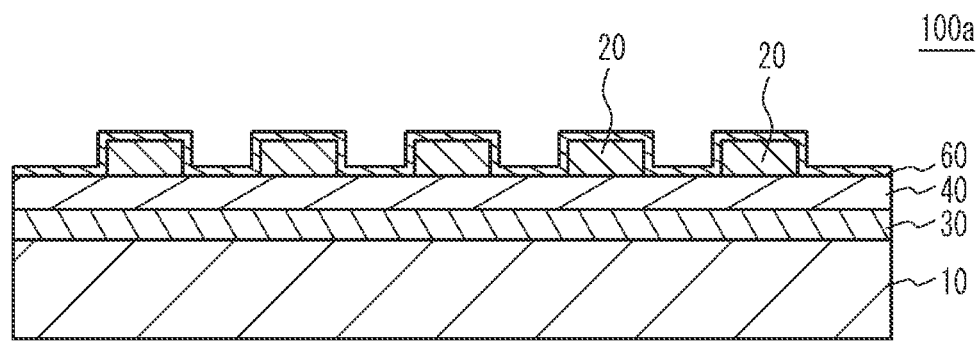
FIG. 4 is a cross-sectional view of the scale according to a second embodiment.

FIG. 4 is a cross-sectional view of a scale 100a according to a second embodiment. The scale 100a is a light reflective-type scale. As exemplified in FIG. 4, the difference between the scale 100a and the scale 100 in FIG. 2 is that the protection film 50 is not provided. For example, in an environment that is not exposed to corrosive liquids, corrosive gas, or the like, the protection film 50 is not required.

Third Embodiment

Figure 5:
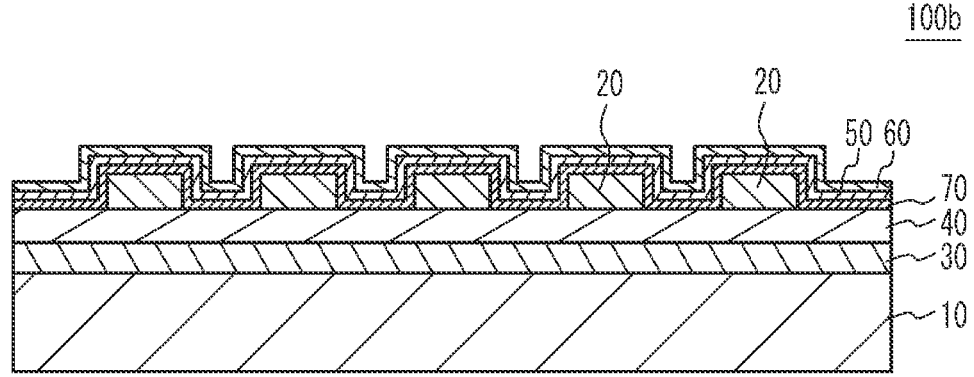
FIG. 5 is a cross-sectional view of the scale according to a third embodiment.

FIG. 5 is a cross-sectional view of a scale 100b according to a third embodiment. The scale 100b is a light reflective-type scale. As exemplified in FIG. 5, the difference between the scale 100b and the scale 100 in FIG. 2 is that a third reflection film 70 is provided between the protection film 50, and the second reflection film 40 and the scale pattern 20. The third reflection film 70 is made of a metal like copper, silver, nickel, vanadium, iron, cobalt, titanium, or tin, or combinations thereof.

For example, the protection film 50 can be formed by performing an oxidation treatment, a nitriding treatment, or the like on a surface of a reflection film that is formed to be used as the third reflection film 70. The remainder of the reflection film where the oxidation treatment or the nitriding treatment is not performed serves as the third reflection film 70.

Fourth Embodiment

Figure 6:
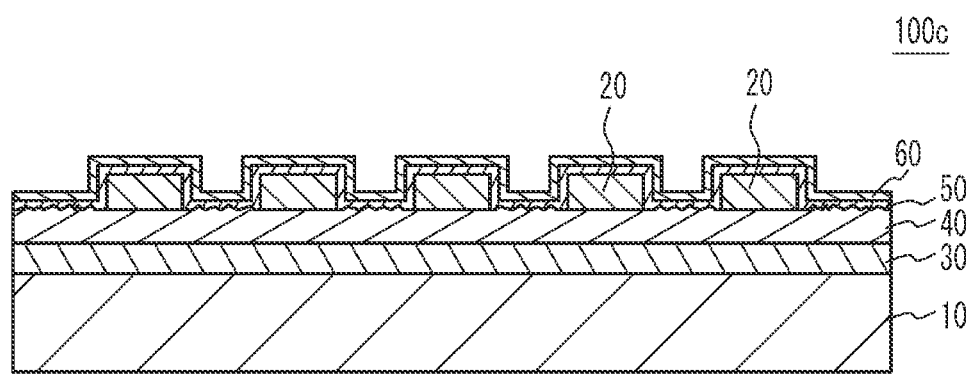
FIG. 6 is a cross-sectional view of the scale according to a fourth embodiment.

FIG. 6 is a cross-sectional view of a scale 100c according to a fourth embodiment. The scale 100c is a light reflective-type scale. As exemplified in FIG. 6, the difference between the scale 100c and the scale 100 in FIG. 2 is that the surface of the second reflection film 40 on the protection film 50 side is a rough surface. The reflectance of the rough surface is lower than the reflectance of a mirror surface, and therefore, the reflectance of the scale pattern 20 and the reflectance of the second reflection film 40 differ. In this way, surfaces having two types of reflectance may be arranged periodically.

Instead of providing a rough surface on the second reflection film 40, the second reflection film 40 may be made of a material having lower reflectance than the scale pattern 20.

Fifth Embodiment

Figure 7:
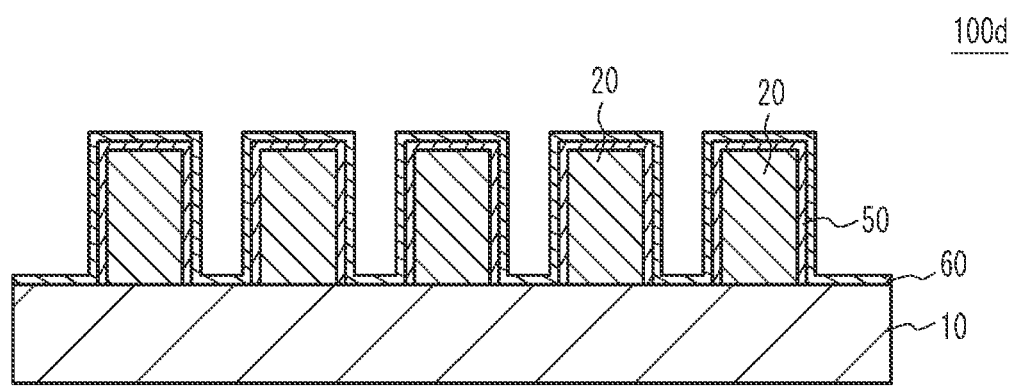
FIG. 7 is a cross-sectional view of the scale according to a fifth embodiment.

FIG. 7 is a cross-sectional view of a scale 100d according to a fifth embodiment. The scale 100d is a light transmissive scale. As exemplified in FIG. 7, the difference between the scale 100d and the scale 100 in FIG. 2 is that a multilayer reflection film is not provided. In other words, the scale 100d is not provided with the first reflection film 30 and the second reflection film 40. In the scale 100d, the substrate 10 is made of a transparent material like synthetic silica, low-expansion glass, soda-lime glass, or alkali-free glass. The scale patterns 20 is made of a transparent material or a translucent material such as synthetic silica.

When the aspect ratio of each grating of the scale pattern 20 has a high value of about 1:2 to 1:10, a distribution in film formation thickness of the protection film 50 and the fluorine film 60 may arise near the top and the bottom of the scale pattern 20. Accordingly, the total thickness of the protection film 50 and the fluorine film 60 is preferably small. For example, when the total thickness of the protection film 50 and the fluorine film 60 is in a range of 5 nm or greater and 30 nm or less, variations in the film formation thickness are inhibited. In addition, with respect to the scale pattern 20 made of synthetic silica, the protection film 50 may not be required because the protection film 50 is made of a similar material. However, with a coat of the monomolecular fluorine, watermarks due to condensation can be inhibited from happening, and so the protection film 50 is effective for improving reliability.

Sixth Embodiment

Figure 8:
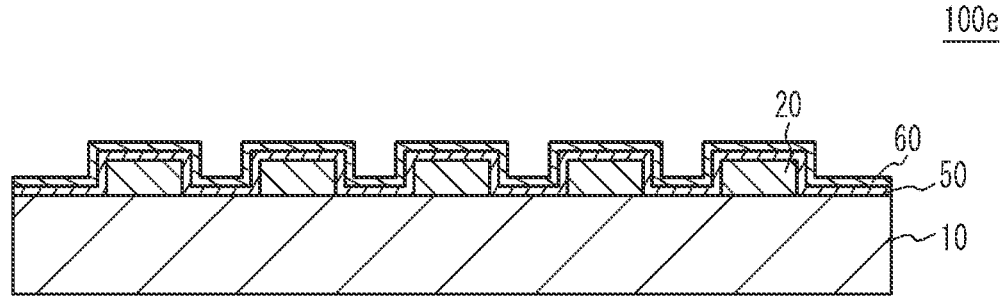
FIG. 8 is a cross-sectional view of the scale according to a sixth embodiment.

FIG. 8 is a cross-sectional view of a scale 100e according to a sixth embodiment. The scale 100e is an electromagnetic induction encoder scale. The scale 100e differs from the scale 100 in that the first reflection film 30 and the second reflection film 40 are not provided and the substrate 10 and the scale pattern 20 use different materials. In the present embodiment, the substrate 10 is made of synthetic silica, soda-lime glass, alkali-free glass, glass composite substrate, or glass epoxy substrate. The scale pattern 20 is made of a metal like copper, silver, or gold, or combinations thereof. The scale pattern 20 has a thickness of about 20 for example.

The protection film 50 is made of a material like $SiO_2$, for example. The protection film 50 has a thickness of less than 30 nm, for example.

In the present embodiment, the protection film 50 serves as a silane coupling binder for the monomolecular fluorine coating. In addition, the protection film 50 acts to suppress progress of corrosion by protecting a boundary surface between the resin and metal.

Figure 9A:
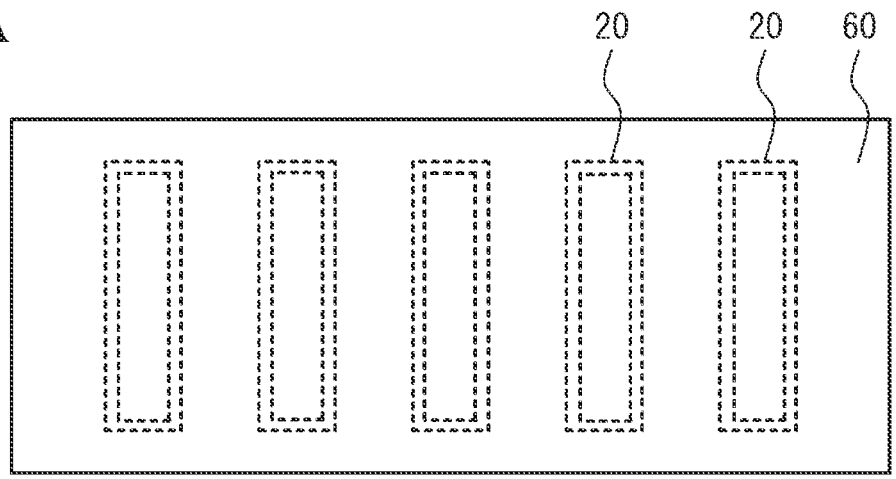
FIGS. 9A and 9B illustrate top views of the scale according to the sixth embodiment.
Figure 9B:
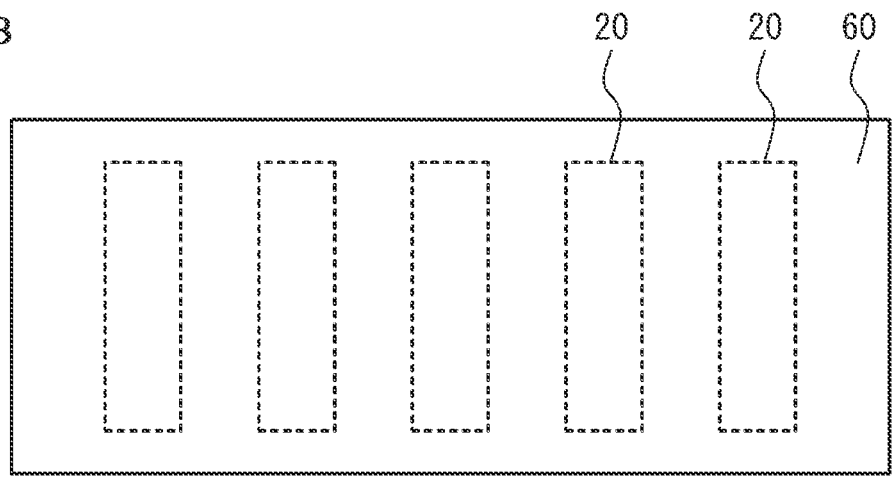

FIGS. 9A and 9B illustrate top views of the scale 100e. In the present embodiment, as exemplified in FIG. 9A, the scale patterns 20 may have a structure in which closed-loop coils are arranged at a predetermined interval. Alternatively, as exemplified in FIG. 9B, the scale patterns 20 may have a structure in which substantially rectangular patterns are arranged at a predetermined interval.

Seventh Embodiment

Figure 10:
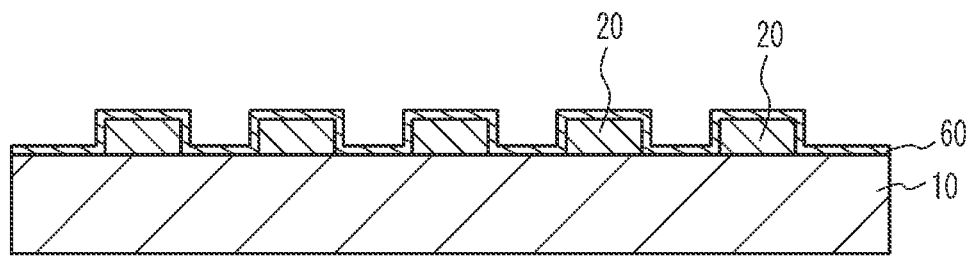
FIG. 10 is a cross-sectional view of the scale according to a seventh embodiment.

FIG. 10 is a cross-sectional view of a scale 100f according to a seventh embodiment. The scale 100f is a scale used as a transmission amplitude grating or a reflective-type amplitude grating. As exemplified in FIG. 10, the difference between the scale 100f and the scale 100 in FIG. 2 is that the multilayer reflection film and the protection film 50 are not provided. In the present embodiment, the substrate 10 can be made of a material like soda-lime glass, a silica glass, and a low-expansion glass. The scale pattern 20 can be made of a material like chrome, copper, gold, silver, aluminum, titanium disilicide, titanium, or nickel, or combinations thereof.

Eighth Embodiment

Figure 11:
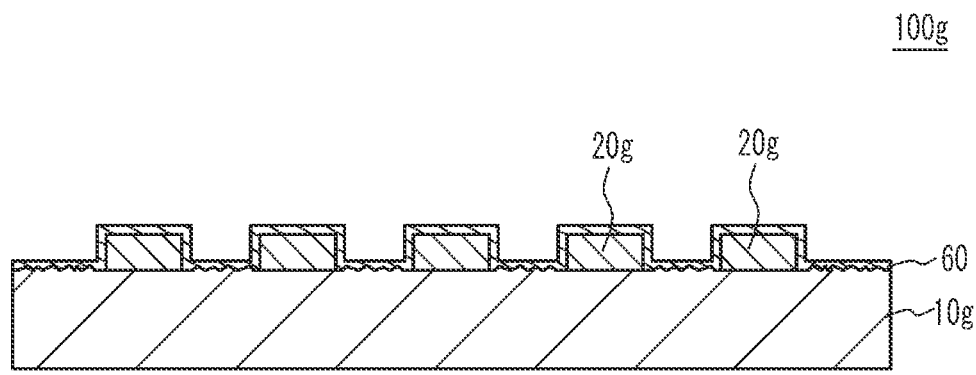
FIG. 11 is a cross-sectional view of the scale according to an eighth embodiment.

FIG. 11 is a cross-sectional view of a scale 100g according to an eighth embodiment. The scale 100g is a metallic tape scale. As exemplified in FIG. 11, the scale 100g includes a metallic tape 10g. The metallic tape 10g is made of a material like stainless steel, a low-expansion metal (such as invar), and a highly reflective metal (such as Cu and Al).

A scale pattern 20g is provided on a first principal surface of the metallic tape 10g. The scale patterns 20g configures a scale grating on the principal surface of the metallic tape 10g. With respect to in-plane directions of the metallic tape 10g, each grating of the scale pattern 20g has a length direction that lies in a direction orthogonal to an array direction of each grating. The scale pattern 20g is made of a material like chrome, copper, gold, silver, aluminum, titanium disilicide, titanium, or nickel, or combinations thereof. The surface of the scale pattern 20g on the opposite side from the metallic tape 10g configures a mirror face.

On the principal surface of the metallic tape 10g, the portions where the scale pattern 20g is not provided have a rough surface. The fluorine film 60 is provided so as to cover the scale pattern 20g and the portions without the scale pattern 20g on the principal surface of the metallic tape 10g.

The scale pattern 20g may be configured by the same material as the metallic tape 10g. This configuration can be achieved by etching the metallic tape 10g, or the like.

In the present embodiment, the metallic tape 10g is an example of a base material.

In the above, embodiments of the present invention are described in detail. However, the present invention is not limited to the specific embodiments noted above, and various modifications and changes are also possible within the scope of the present invention described in the claims.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A scale comprising:
    a base material;
    a plurality of scale patterns arranged at a predetermined periodicity on a main surface of the base material; and
    a fluorine film that covers the plurality of scale patterns and is at least partly a monomolecular fluorine compound.

2. The scale according to claim 1, wherein a maximum thickness from a surface of each scale pattern of the plurality of scale patterns, to a surface of the fluorine film is 5 nm or greater and 30 nm or less.

3. The scale according to claim 1, further comprising a transparent dielectric film provided between the plurality of scale patterns and the fluorine film and that covers each scale pattern of the plurality of scale patterns.

4. The scale according to claim 2, further comprising a transparent dielectric film provided between the plurality of scale patterns and the fluorine film and that covers each scale pattern of the plurality of scale patterns.

5. The scale according to claim 3, wherein a total thickness of the fluorine film and the dielectric film is 5 nm or greater and 30 nm or less.

6. The scale according to claim 4, wherein a total thickness of the fluorine film and the dielectric film is 5 nm or greater and 30 nm or less.

7. The scale according to claim 3, wherein the dielectric film is made of $SiO_2$.

8. The scale according to claim 4, wherein the dielectric film is made of $SiO_2$.

9. The scale according to claim 5, wherein the dielectric film is made of $SiO_2$.

10. The scale according to claim 6, wherein the dielectric film is made of $SiO_2$.

11. The scale according to claim 1, wherein the plurality of scale patterns is made of metal.

12. The scale according to claim 1, wherein:
    the base material is made of a transparent material, and
    the plurality of scale patterns is made of one of a transparent material or a translucent material.

13. The scale according to claim 11, wherein the base material is a metallic tape.

* * * * *